United States Patent [19]

Takeuchi

[11] 4,195,661

[45] Apr. 1, 1980

[54] VACUUM TYPE SERVOMETER FOR VEHICLE USE

[75] Inventor: Hiroo Takeuchi, Ueda, Japan

[73] Assignee: Nissin Kogyo Kabushikia Kaisha, Ueda, Japan

[21] Appl. No.: 909,656

[22] Filed: May 25, 1978

[30] Foreign Application Priority Data

Jun. 30, 1977 [JP] Japan ...... S2-86708

[51] Int. Cl.² ............................................. F16K 15/04
[52] U.S. Cl. ................................ 137/515.5; 91/369 B; 285/180
[58] Field of Search ................. 91/432, 369 R, 369 A, 91/369 B; 285/180, 184, 406, 413; 137/515.5

[56] References Cited

U.S. PATENT DOCUMENTS

| | | | |
|---|---|---|---|
| 3,013,533 | 12/1961 | Brown | 91/369 B |
| 3,013,535 | 12/1961 | Schultz | 91/369 B |
| 3,500,757 | 3/1970 | Thoma et al. | 285/180 X |
| 3,600,012 | 8/1971 | Stafford | 285/413 |
| 3,845,692 | 11/1974 | Takeuchi | 91/369 B |

FOREIGN PATENT DOCUMENTS

1403901  8/1975  United Kingdom .................. 91/369 B

*Primary Examiner*—William R. Cline
*Attorney, Agent, or Firm*—Haseltine, Lake & Waters

[57] ABSTRACT

On the wall of a booster shell which defines a vacuum chamber, a nonreturn-valve casing is formed in two halves. One casing half is formed integral with the wall of the booster shell and the other casing half is rotatably fitted to the former. With the first casing half formed in effect as a part of the wall of the booster shell, there is no leakage of vacuum from the booster shell to the exterior thereof. The second casing half has an L-shaped connector pipe formed integral therewith for connection with a vacuum line and the bent tip portion of the L-shaped connector pipe can be set in any radial direction simply by adjusting the angular position of the second casing half relative to the first.

2 Claims, 3 Drawing Figures

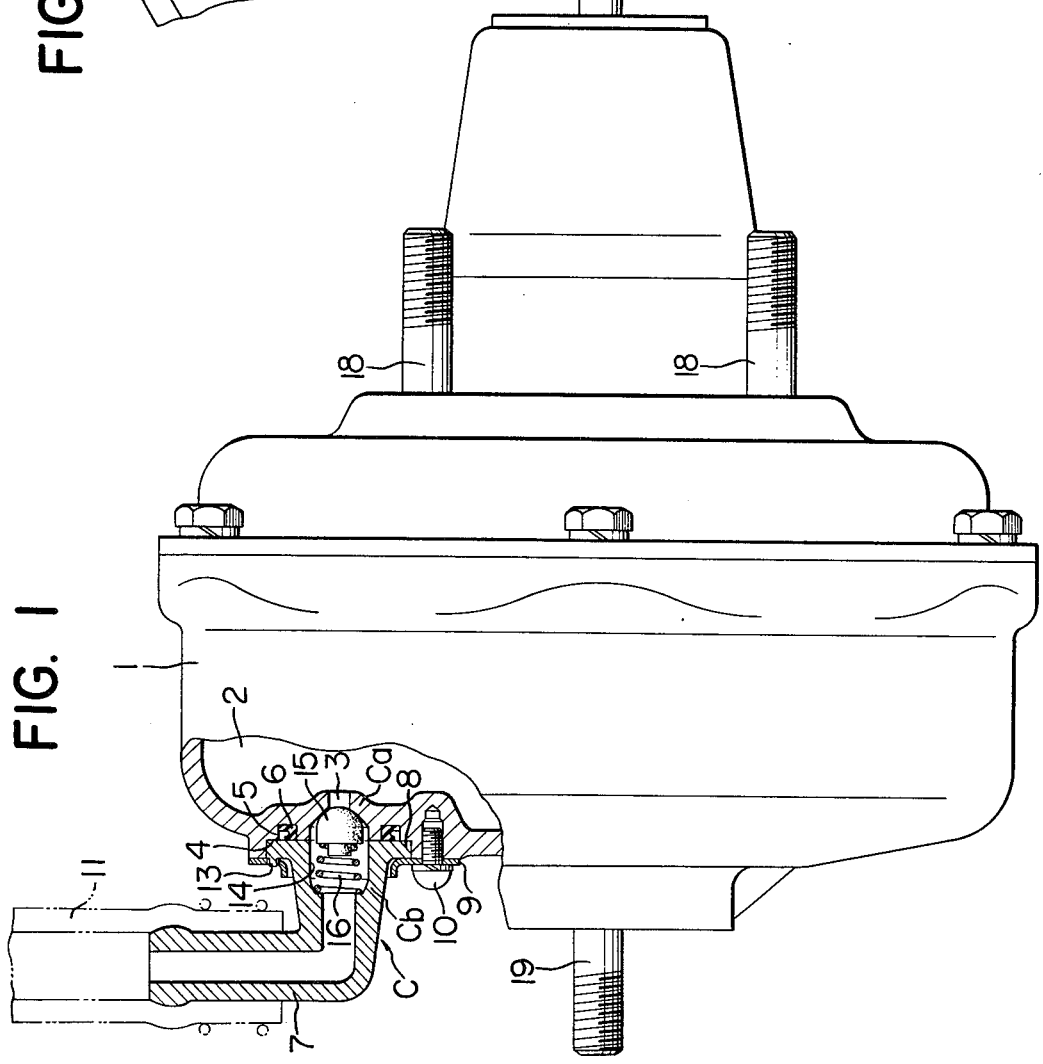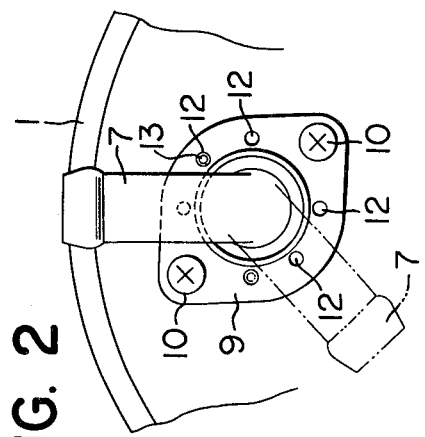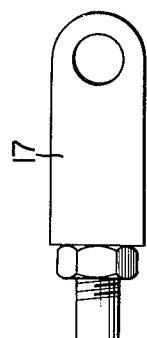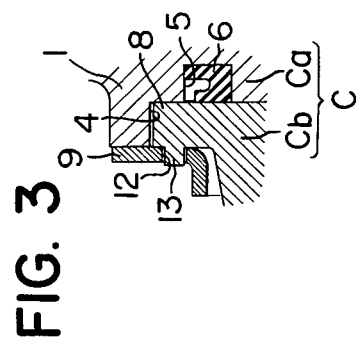

VACUUM TYPE SERVOMETER FOR VEHICLE USE

BACKGROUND OF THE INVENTION

This invention relates to vacuum type servomotors for vehicle use which are employed to amplify the force of pressure as an input to a fluid mechanism such as an automotive brake master cylinder.

Generally, a vacuum type servomotor for vehicle use utilizes engine-intake-duct vacuum as its controlling medium and includes, among others, a nonreturn valve arranged between a vacuum chamber to be held at all times under a vacuum and the engine intake duct to prevent any back flow of vacuum from the vacuum chamber to the engine intake duct so that the vacuum may be held in the vacuum chamber even when the vacuum in the engine intake duct is reduced. Previously, however, the casing of such nonreturn valve has been more or less complicated in structure, involving the danger of vacuum leakage from the vacuum chamber.

Further, in order to mount the vacuum servomotor on different types of vehicle, it has often been necessary to change the position in which the vacuum inlet line is connected to the servomotor in accordance with the location of the servomotor on the vehicle and that of the engine intake duct as a vacuum source therefor. To meet this situation, it has been usual to resort to some change or other in design of the structure for vacuum connection of the servomotor.

SUMMARY OF THE INVENTION

The present invention is intended to overcome the difficulties previously encountered in the art as described above and it is a primary object of the invention to simplify the structure of the nonreturn-valve casing thereby to reduce the cost of fabrication of the servomotor while at the same time preventing any leakage of vacuum from the vacuum chamber of the servomotor.

A secondary object of the present invention is to provide a vacuum type servomotor which is usable on different types of vehicle without the need for any change in design of the servomotor, including a connector pipe mounted on the booster shell or casing structure of the servomotor and freely adjustable in angular position relative thereto for connection with the vacuum inlet line to the servomotor.

The above and other objects, features and advantages of the present invention will become apparent from the following description of a preferred embodiment thereof, reference being had to the accompanying drawing.

BRIEF DESCRIPTION OF THE DRAWING

In the drawing:

FIG. 1 is a side elevational view of a servomotor embodying the present invention, partly cutaway to show the essential part thereof in vertical cross section;

FIG. 2 is a front elevational view of the part shown in FIG. 1; and

FIG. 3 is a fragmentary vertical cross section, on an enlarged scale, of the part shown in FIGS. 1 and 2.

DESCRIPTION OF THE PREFERRED EMBODIMENT

Referring first to FIG. 1, reference numeral 1 indicates a booster shell of the vacuum type servomotor illustrated, and in which shell is defined a vacuum chamber 2.

A valve casing C is provided on the front face of the booster shell 1 and has a valve chamber 14 defined therein. The valve casing C is made in two halves, that is, a first casing half Ca and a second casing half Cb. The first casing half Ca is formed on the front wall of booster shell 1 integrally therewith and has a valve port 3 formed therein to communicate the valve chamber 14 with the vacuum chamber 2. The second casing half Cb has an L-shaped connector pipe 7 formed integral therewith at the front end of the casing half. Arranged in the valve chamber 14 are a nonreturn valve element 15 formed for seating engagement with the valve port 3 and a valve-closing spring 16 normally biasing the valve element 15 in a direction for seating engagement with the valve port. A flexible vacuum inlet hose 11, leading from a vacuum source, in the form of an engine intake duct, is fitted over the tip of connector pipe 7 for connection therewith.

With the arrangement described above, when a vacuum occurs in the vacuum source which is higher than that in the vacuum chamber 2, the nonreturn valve element 15 is moved to open the valve port 3 under the pressure difference between the valve and vacuum chambers 14 and 2 so that the vacuum arising in the vacuum source is introduced into the vacuum chamber 2 through the vacuum inlet hose 11 and valve chamber 14. Subsequently, when the vacuum in the vacuum source is reduced, the nonreturn valve 15 is restored to close the valve port 3 under the bias of valve-closing spring 16, thus precluding any back flow of vacuum from the vacuum chamber 2 through the valve port 3 to the vacuum source side.

As illustrated, the first half Ca of the valve casing C is formed in its outer end face with an annular recess 4 which surrounds the valve chamber 14 and in the annular bottom of which recess is formed an annular groove 5, in which a seal ring 6 is fitted. The second half Cb of the valve casing C is formed at its inner end with a radially extending annular mounting flange 8, which is rotatably fitted in the annular recess 4 in the first casing half Ca for pressure engagement with the seal ring 6. A presser plate 9 of substantially annular configuration is detachably secured to the adjacent wall of the booster shell 1 to hold the second casing half Cb in place with its mounting flange 8 pressed against the annular bottom of recess 4 in the first casing half Ca.

As shown clearly in FIG. 2, the presser plate 9 is formed with a plurality (six in the embodiment illustrated) of positioning holes 12 which are spaced apart at regular intervals circumferentially along a circle concentric with the mounting flange 8 of the second casing half Cb. At least one positioning projection 13 is formed on the mounting flange 8 for selective fitting engagement with the positioning holes 12 formed in the presser plate 9. With this arrangement, it will be recognized that the second half Cb of the valve casing C can be assembled onto the first casing half Ca with the tip or bent end of the L-shaped connector pipe 7 directed as desired, simply by fixing the presser plate 9 to the booster shell while holding the second casing half Cb in the recess 4 in an angular position selected to hold the tip of connector pipe 7 in the desired direction. As will be readily understood, in the angular position selected of the second casing half Cb, the positioning projection 13 on the mounting flange 8 thereof is in a position to fit in one of the positioning holes 12 in the presser plate 9.

Though in the embodiment illustrated the positioning holes 12 and positioning projection 13 are provided on the presser plate 9 and mounting flange 8, respectively, they may conversely be formed on the mounting plate 8 and presser plate 9, respectively, with quite the same result.

Referring again to FIG. 1, reference numeral 17 indicates a push rod to be operatively connected with a brake pedal, not shown; 18, threaded mounting bolts provided to secure the booster shell 1 to the vehicle frame; and 19, a threaded bolt provided for interconnection of the booster shell 1 and a brake master cylinder, not shown.

It will be readily appreciated from the foregoing that, according to the present invention, the casing C of nonreturn valve 15, consisting of a first half Ca formed on the wall of the booster shell 1 integrally therewith and a second half Cb detachably joined to the first half Ca, is particularly simplified in structure as part of the wall of booster shell 1 in effect serves as the first casing half Ca and that, since apparently no joint whatsoever exists between such first casing half Ca and the booster shell itself, there is no danger of any leakage of vacuum from within the booster shell to the exterior thereof or into the valve chamber 14. It will also be readily appreciated that the valve chamber 14 can be made open simply by removing the second casing half Cb from the adjacent wall of booster shell 1, serving as the first casing half Ca, whenever desired for maintenance operation such as renewal of the nonreturn valve element 15 or biasing spring 16.

According to a further feature of the present invention, the connector pipe 7, formed on the second half Cb of the valve casing C for connection with vacuum inlet hose 11, is bent in the shape of L and the mounting flange 8 formed on the second casing half Cb at its inner end is rotatably fitted in the annular recess 4 formed in the adjacent, outer end face of the first casing half Ca and held against the bottom surface of the recess 4 by means of presser plate 9, which is detachably secured to the adjacent wall of the booster shell, as described hereinbefore in detail. Such structural feature of the valve casing C makes it possible freely to change the direction of the tip portion of connector pipe 7 in accordance with the location of the servomotor on the vehicle and that of the vacuum source; and this enables the same servomotor to be used on different types of vehicle and thus enables production of such servomotor in increased quantities and at reduced cost.

What is claimed is:

1. In a vacuum type servomotor for vehicle use including a booster shell defining therein a vacuum chamber, a valve casing formed of first and second halves, the first half being formed integral with the adjoining wall of said booster shell and having a valve port formed in communication with said vacuum chamber, the second half of said valve casing being detachably joined to said first valve casing half to define a valve chamber together therewith, a nonreturn valve element arranged in said valve chamber for seating engagement with said valve port, and a valve-closing spring disposed in said valve chamber normally to bias said nonreturn valve element in a direction for seating engagement with said valve port, the improvement comprising: an L-shaped connector pipe integrally formed with said second casing half for connection with a vacuum inlet line leading from a vacuum source, an annular recess formed in the outer end face of said first valve casing half in surrounding relation to said valve chamber, an annular mounting flange integrally formed with said second valve casing half at the inner end thereof and rotatably fittted in said annular recess, and a presser plate detachably secured to the adjoining wall of said booster shell to fix said mounting flange in any desired angular position in said annular recess.

2. A vacuum type servomotor as defined in claim 1 wherein a tip portion of said connector type is freely variable in accordance with the location of the servomotor on a vehicle and the location of the vacuum source for enabling the servomotor to be usable on different types of vehicles, said L-shaped connector type being rigidly connected with said booster shell and being prevented from angular displacement and loosened upon application of vibratory and twisting loads.

* * * * *